Figure 1:
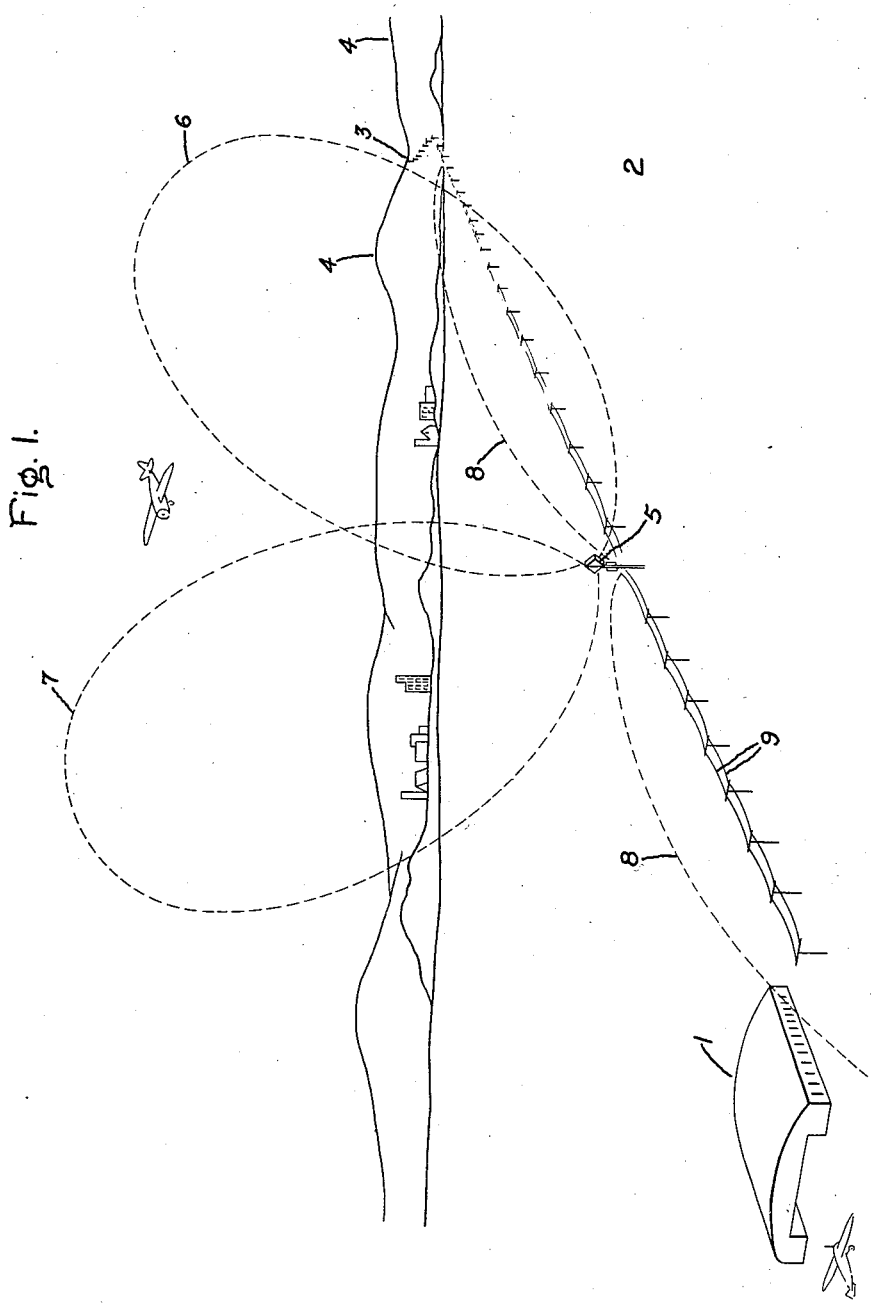

Inventor:
Ernst F. W. Alexanderson,
by Harry E. Dunham.
His Attorney.

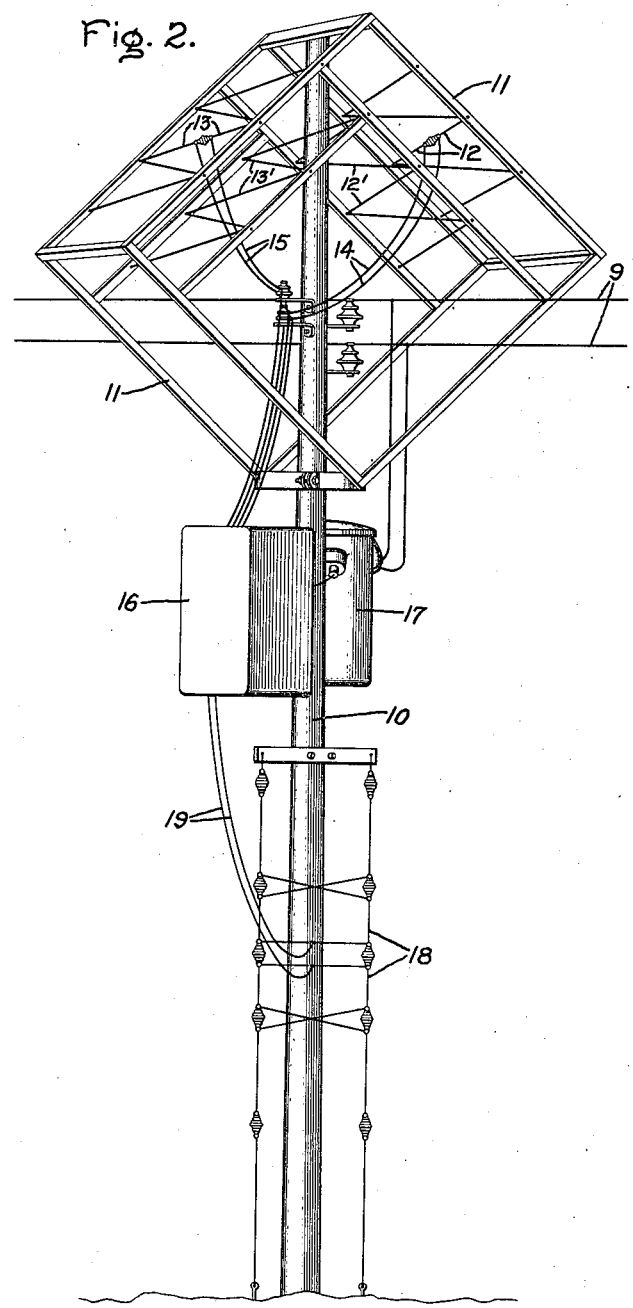

Dec. 26, 1939.   E. F. W. ALEXANDERSON   2,184,267
COURSE GUIDING SYSTEM
Filed May 29, 1937   5 Sheets-Sheet 3
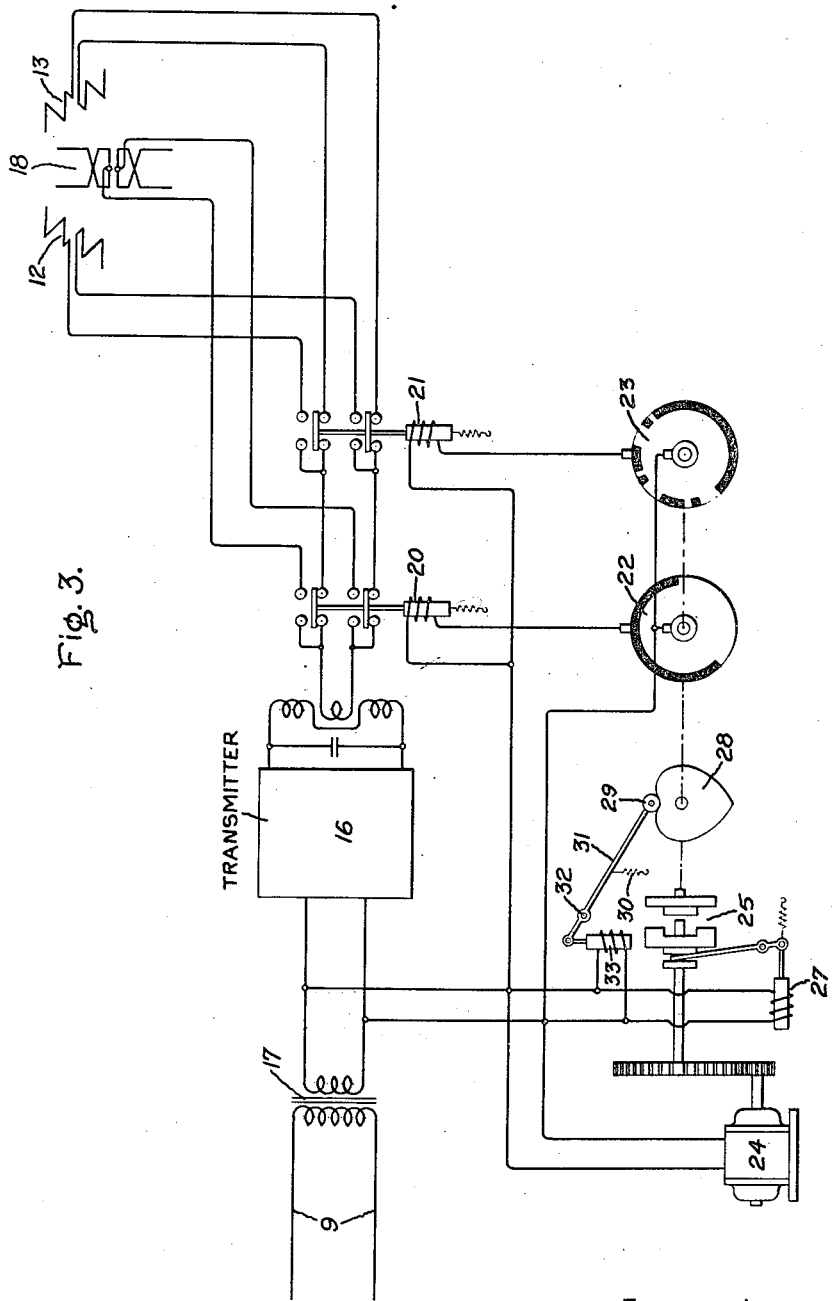
Inventor:
Ernst F. W. Alexanderson,
by Harry E. Dunham
His Attorney.

Dec. 26, 1939.　　E. F. W. ALEXANDERSON　　2,184,267
COURSE GUIDING SYSTEM
Filed May 29, 1937　　5 Sheets-Sheet 4
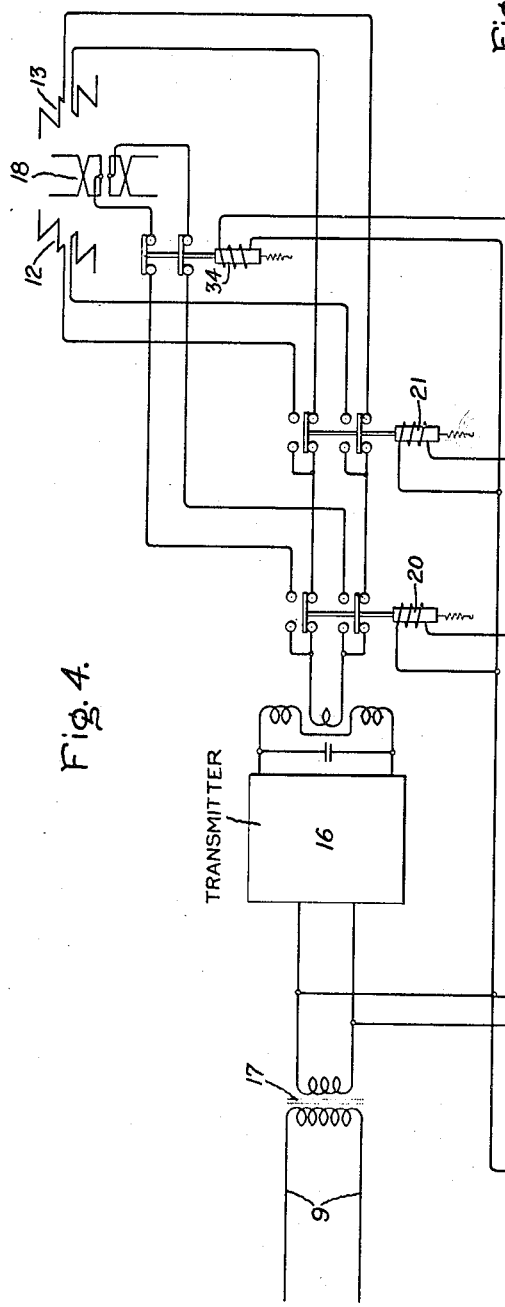
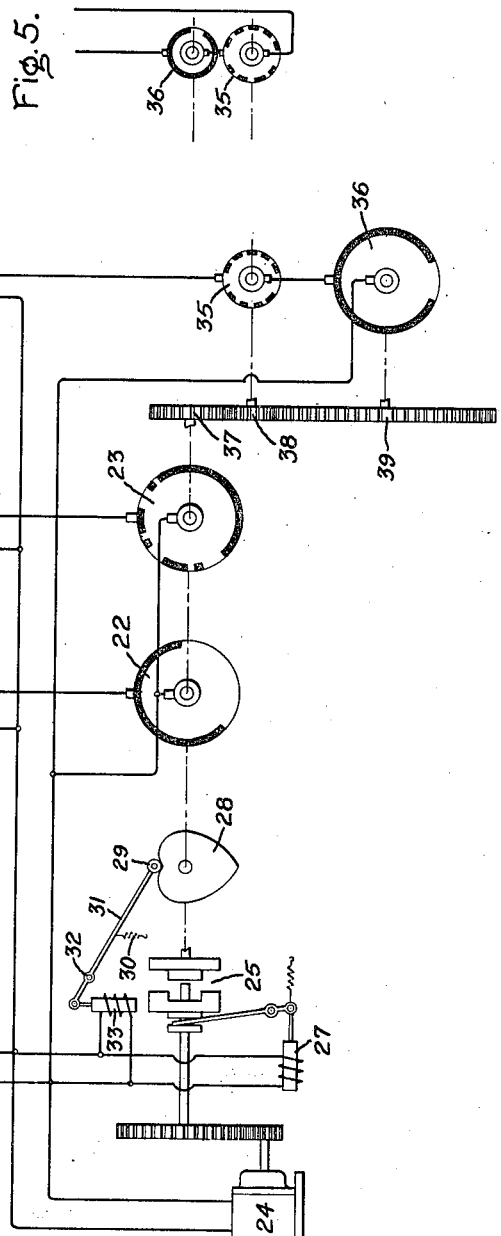
Inventor:
Ernst F. W. Alexanderson,
by Harry E. Dunham
His Attorney.

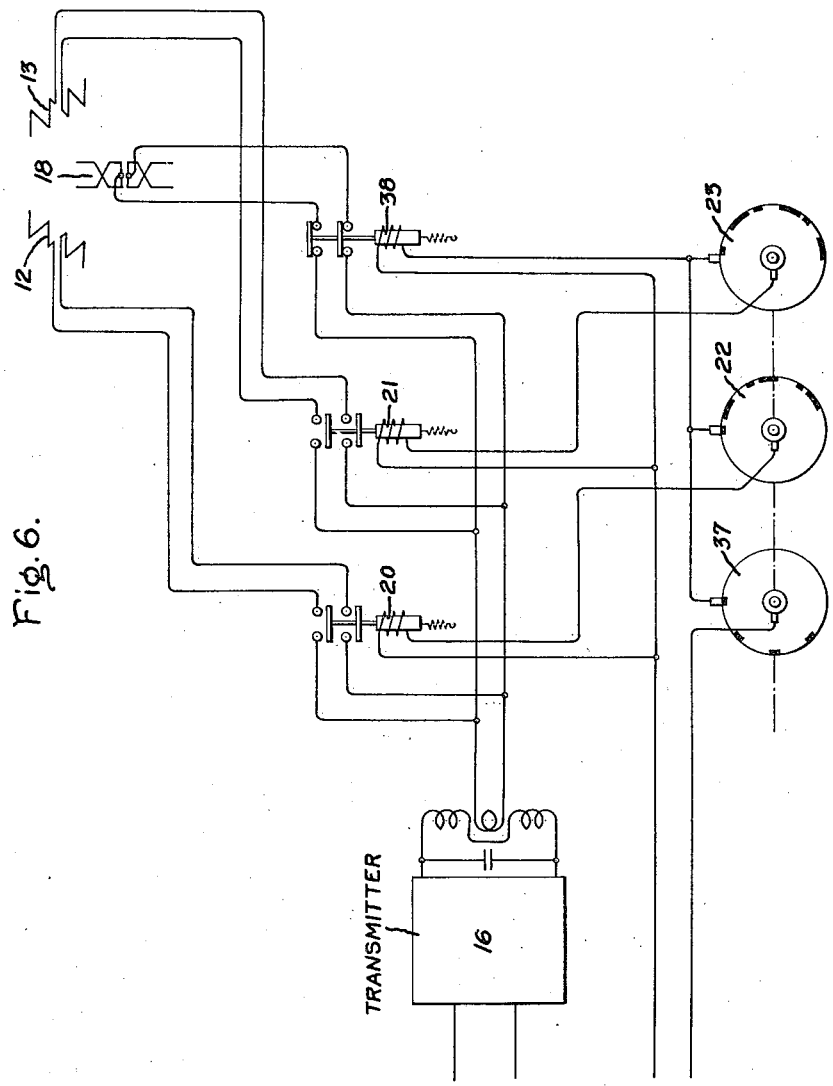

Patented Dec. 26, 1939

2,184,267

UNITED STATES PATENT OFFICE 2,184,267

COURSE GUIDING SYSTEM

Ernst F. W. Alexanderson, Schenectady, N. Y., assignor to General Electric Company, a corporation of New York Application May 29, 1937, Serial No. 145,522

11 Claims. (Cl. 250—11)

My invention relates to course guiding systems for aircraft and it has for one of its objects to provide improved means for guiding aircraft throughout the length of an extended course.

In United States Patent No. 1,917,114, issued July 4, 1933, to John Hays Hammond, Jr. and myself, is shown a system for guiding aircraft in which fan-shaped radiations are produced vertically at spaced intervals along the course, the fan-shaped radiations extending longitudinally of the course and overlapping at high elevations to produce at such high elevations a field intensity which is substantially uniform throughout the length of the course.

My invention relates to certain improvements in systems of this type whereby the definiteness of the course indication is improved and whereby an improved indication of altitude is secured. In addition to providing such improvements my invention has for its object to provide means to indicate to the operator of the craft the position of the craft along the course and also weather conditions or storm warnings when necessary.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 illustrates a course provided with my invention; Fig. 2 illustrates the radiating systems employed; Figs. 3, 4 and 6 indicate control equipment associated with the different systems, and Fig. 5 indicates a modification of the arrangement shown in Fig. 4.

Referring to Fig. 1 of the drawings I have indicated in the lower left-hand corner thereof an aircraft hangar 1 which may be located at an airport. From the landing field of said airport an airway or course extends first across the level terrain 2 adjacent to the port and thence through a valley 3 between the distant hills 4. At spaced intervals along this course radiating systems 5 are provided, each of these radiating systems including means for projecting two beams in a vertical plane, the field pattern of one of these beams in the vertical plane at right angles to the course being indicated at 6 and that of the other beam being indicated at 7. These beams, in planes formed by the course and the axis of the field pattern 6 and 7, are of fan shape, the fans extending longitudinally of the course and at substantial angles, as for example 45° on opposite sides of the vertical. These radiating means are positioned at intervals along the course such that the fans overlap to produce substantially uniform field intensity at high elevation or at the elevations of usual flight of aircraft along the course. All of the radiations on one side of the course are modulated in a particular manner, as for example, by a particular audio frequency, or telegraphically, as with the letter A. Similarly the radiations on the opposite side of the course are modulated with a different frequency, or telegraphically with a different letter, such as the letter N, the letters A and N, if employed, being interlocked to produce a continuous dash in an equisignal zone directly over the course, such as is commonly done in connection with the present day course beacons.

Thus an aircraft following the course may follow this equisignal zone throughout its length and thus be provided with an indication of the position of the course which is of substantially unvarying definiteness throughout the length of the course. It is preferred, however, that aircraft flying in one direction on the course should persist at one side of the equisignal zone, as for example on the A side, whereas craft flying in the opposite direction should persist on the opposite side of the equisignal zone, as on the N side, thereby avoiding the danger of collision by reason of craft flying in opposite directions on the same course.

Certain, or all, of the radiating systems 5 disposed along the course are provided with additional radiating means for projecting a beam at a low angle directly along the course. These beams are indicated at 8 on the drawings, the radiating system preferably being bidirectional to produce beams in each direction therefrom along the course. These beams may be modulated in respects different from those of beams 6 and 7 to be distinguishable from the signal of the other beams whereby when the craft drops to an elevation lower than that of usual flight the signals of these beams are received with increased intensity thereby informing the operator of his low altitude. Of course the lower the craft, the stronger the intensity of the field of this beam and the stronger the indication of the low altitude.

The transmitting means for energizing the different radiating systems is supplied with power from a power line 9 which may extend throughout the length of the course and which may be employed to effect synchronism of the signals radiated by the different radiating means, or to effect such other control as may be desirable.

In Fig. 2 is shown one type of radiating system which may be employed along the course. This system comprises a pole 10 of the power line and which supports the power line conductors 9. At the top of this pole is mounted a framework 11 of suitable construction having two directional antennae mounted therein, the conductor of one of these antenna being indicated at 12 and that of the other of these antennae being indicated at 13. Such antennae are described in the patent above referred to, those here differing therefrom only in that they are oriented preferably at 45° to the vertical. In order that the beam radiated by these antennae shall be unidirectional, reflectors 12' and 13' are provided in association therewith. These antennae 12 and 13 are supplied with energy of the high frequency to be radiated through transmission lines 14 and 15 extending to a housing 16 for the high frequency generating and controlling equipment. This housing is mounted in proximity to the power transformer 17 which supplies the power for energization of the transmitting equipment. The radiator for producing the low angle radiation is shown at 18 mounted lower on the pole and oriented to produce beams along the course; that is, at right angles to the beams produced by the antennae 12 and 13. This antenna 18 may be of any suitable construction but preferably is of the extended doublet type described in my Patent 1,775,801, issued September 16, 1930, and is supplied with high frequency energy from the transmitting equipment within the housing 16 through the transmission line 19.

Of course the equipment for controlling the radiation produced by the various antennae may vary widely. Fig. 3 illustrates one form of such equipment. In this figure the antennae 12, 13 and 18 are indicated conventionally in the upper right-hand corner. Conductors from the power line 9 are indicated at the left end of the drawing leading to the transformer 17, the secondary of which supplies energy to the transmitting equipment 16. The output from the transmitter 16 is connected through the contacts of a pair of relays 20 and 21 to the different antennae. These relays 20 and 21 are energized from the secondary winding of the transformer through circuits controlled by commutators 22 and 23 respectively. These commutators are rotated by a motor 24, which is, likewise, energized from the secondary winding of the transformer 17, through a suitable magnetic clutch 25, which is provided for a purpose later to be described.

Magnetic clutch 25 is controlled by means of a magnet 27 which when energized causes the clutch to engage whereby commutators 22 and 23 are driven by the motor. When this magnet is deenergized the clutch is disengaged. The shaft of commutators 22 and 23 is provided with a cardioid, or heart-shaped, cam 28 having a rider 29 bearing upon its periphery by reason of pressure exerted by a spring 30. This rider is carried by an arm 31 pivoted at 32 and which is operated by a magnet 33. When the magnet 33 is deenergized the rider 29 falls upon the periphery of the cam 28 and thereby causes the commutators 22 and 23 to rotate to an initial position which is that shown in the drawings.

In this way by removal of power from the power line the magnetic clutches 25 of all the different radiating systems are disengaged and the commutators 22 and 23 are returned to a position corresponding to that shown in the drawings.

In this position when power is reapplied to the power line relays 20 and 21 remain deenergized by reason of the position of the commutators. High frequency energy is then applied through the contacts of relays 20 and 21 to the antenna 13. About three-fifths of the periphery of commutator 23 is provided with alternate conducting and non-conducting segments to produce the telegraphic signals A and N whereby after a slight rotation of the commutator 23 relay 21 becomes energized and in turn transfers the output of the transmitter to antenna 12. Alternate energization and deenergization of relay 21 thus causes energy to be radiated alternately from the two antennae 12 and 13, the radiation of the antenna 13 being in accordance with the character A and that from the antenna 12 being in accordance with the character N. Preferably sufficient segments are provided in the three-fifths of commutator 23 referred to to produce at least three A's and three N's during each rotation of the commutator.

The corresponding three-fifths of the periphery of commutator 22 is nonconducting, the alternate two-fifths being a continuous conducting segment. When the brush of the commutator 22 rides upon the conducting portion of the periphery of that commutator relay 20 becomes energized and thus deenergizes antennae 12 and 13 and transfers the output from the transmitter to the low beam radiator 18 whereby a continuous radiation is produced from this radiator during about two-fifths of a revolution of the commutator.

An aviator traveling the course in an aircraft and listening to the signals through his ordinary receiver will hear first the radiations from the antennae 12 and 13 and then from the antenna 18. If he be at high elevation and at one side of the course he will hear the three characters A or N with strong signal intensity alternated with a continuous long dash from the low angle radiator, this dash being of low intensity. This tells him that he is at high elevation and at one side of the course. If he be at lower elevation the long dash will be of a strong intensity and the A and N signals of weak intensity telling him that he is at low elevation. Of course if he be directly on the course the A and N signals blend to form a continuous signal which at high elevation is of strong intensity. At lower elevations this signal becomes weaker and the alternate signal from the low angle radiator becomes stronger, this latter signal being of duration shorter than that of the continuous dash produced by the A and N signals of equal intensity. Of course the pilot preferably is instructed not to fly directly on the course but to fly where he receives the A and N signals with different intensities.

Since these signals are produced by all of the different radiating systems along the course it is necessary that the commutators 22 and 23 be synchronized. With the arrangement shown this is effected by means of the synchronous motor 24. It may occur, however, that after a period of continuous operation the commutators in the different systems become somewhat displaced with respect to each other and resynchronizing is necessary. This is effected by removal of power from the power transmission line thereby deenergizing magnets 27 and 33. When this occurs the clutch 25 is disengaged and the rider 29 is pulled against the surface of the cam 28 by means of the spring 30 thereby causing rotation of the cam and commutators 22 and 23 to the position shown in the drawing. Commutators of all the different stations then occupy the same positions and when power is reapplied to the line the operation again becomes in synchronism. This resynchronizing of the systems may be effected at periodic intervals as required.

Fig. 4 is similar with Fig. 3 but includes additional means to indicate to the pilot his position along the course. This means comprises an additional relay 34 having contacts connected in circuit with the radiator 18, this relay being energized through commutators 35 and 36. These commutators are driven from the shaft of commutators 22 and 23 through gears 37, 38 and 39 which are of such ratio that the commutator 35 makes a complete revolution during a small portion of two-fifths of a revolution of commutator 22 and commutator 36 makes but one revolution in several revolutions of the commutator 22. Commutator 36 has a small conducting segment on its periphery, this segment being of such length and so positioned with respect to the conducting segment of the periphery of commutator 22 that it completes a circuit during the same interval that the circuit is completed through the conducting segment 22 but by reason of the slower rotation of the commutator 36 its circuit is completed once in only four or five revolutions of the commutator 22. During the interval when the circuit is completed through commutator 36 this same circuit is interrupted in accordance with telegraph signals by means of the commutator 35, these signals for example, corresponding to the position along the course or to the number of the particular radiator from which it is radiated. Thus the operator may be guided by the system in the manner described in connection with Fig. 3 but every fourth or fifth altitude indicating impulse is broken up in accordance with telegraphic impulses indicating the position on the course. The intensity of these impulses, of course, is still indicative of the altitude of the craft.

Cam 35 may also be made removable for substitution of different cams corresponding to different signals such as signals concerning weather conditions, storm warnings, etc.

Fig. 5 is a modification of the arrangement shown in Fig. 4 whereby the position indication signal is transmitted during the last portion of each altitude indicating signal. To effect this the commutator 36 is mounted directly on the shaft of commutator 22 and is provided with a conducting segment which completes the circuit of relay 34 during the last portion of the time when the circuit of relay 20 is completed by commutator 22. The commutator 35 is geared to the shaft of commutator 22 as shown in Fig. 4 and with such ratio that it makes a complete revolution during the time that the circuit is completed through commutator 36.

My invention as thus far described is adapted more particularly for cooperation with a signal receiving system on the aircraft of the audible type. It is frequently desirable, however, to provide indications of the visual type. This may be effected in connection with the course indication by modulation of the carrier waves radiated on opposite sides of the course with currents of different frequency as previously described, or in other respects.

In Fig. 6 I have shown an arrangement which may be employed in connection with visual indicating means of known type for the indication of altitude. In this figure cams 22 and 23 are arranged to produce A and N signals by means of relays 20 and 21, these relays being controlled through a circuit which includes an additional commutator 37 on the same shaft with commutators 22 and 23. Commutators 22 and 23 are adapted to produce the A and N signals during a desired portion of the revolution of the commutator and to complete the circuit between their respective brushes during the remainder of the revolution. During this time when the circuit is completed for a continuous interval by commutators 22 and 23 it is alternately completed and interrupted by the corresponding portion of the commutator 37, these interruptions being in accordance with dashes and dots. An additional relay 38 having contacts in the circuit supplying radiator 18 is also connected to be energized through the commutator 37 so that all of these relays 20, 21 and 38 are simultaneously energized and deenergized. The contacts of these various relays, however, are so arranged that when the relays are deenergized relay 38 opens the circuit to radiator 18 and relays 20 and 21 complete the circuits to radiators 12 and 13. Thus a dot is radiated from the high elevation antennae 12 and 13. During the next instant when a conducting portion of the commutator 37 is under the cooperating brush, and the relays are energized, relay 38 completes the circuit to radiator 18 and relays 20 and 21 interrupt the circuits to radiators 12 and 13. Thus a dash is radiated by the radiator 18. These signals when received upon aircraft thus produce a series of dots at high elevation and dashes at low elevation whereby the pilot in flying the course may determine his elevation. Means are already known in the art whereby signals of the dot and dash type may be employed to produce right and left indications on an instrument of the deflecting needle type, that is, the index of the instrument is deflected to the right in response to dashes and to the left in response to dots. By use of such an instrument in accordance with the form of my invention indicated in Fig. 6 the altitude may be visually indicated.

While I have shown certain particular embodiments of my invention, it will, of course, be understood that I do not wish to be limited thereto since many modifications both in the circuit arrangement and in the instrumentalities employed may be made. I contemplate by the appended claims to cover any such modifications as fall within the true spirit and scope of my invention.

What I claim as new and desire to secure by Letters Patent of the United States, is:

1. The combination, in a system for guiding aircraft along a course, of a plurality of high frequency radiating systems arranged at intervals along said course, each of said radiating systems including means for producing distinctive radiations at different angles in a vertical plane at right angles to the course, said intervals being sufficiently short that at the altitudes of usual flight along said course said distinctive radiations are substantially continuous throughout the entire length of the course.

2. The combination, in a system for guiding aircraft along a course, of a plurality of high frequency radiating systems arranged at intervals along said course, each of said radiating systems including means for producing maximum radiations in each of two directions in a vertical plane at right angles to the course, the radiation in one of said directions being distinctive from that in the other direction, and said intervals being sufficiently short that the fields produced by different radiating systems overlap at the altitudes of usual flight along the course.

3. The combination, in a system for guiding aircraft along a course, of a plurality of radiating systems spaced apart at intervals along said course, each of said radiating systems including means to produce two radiations distinctive from each other, one of said radiations having maximum intensity in a plane at right angles to the course and at an angle at one side of the vertical, and the other radiation having maximum intensity in a plane at right angles to the course and at an angle at the other side of the vertical, said systems being spaced at such distances that said radiations may be received by aircraft at all points along said course at the altitudes of usual flight.

4. The combination, in a system for guiding aircraft along a course, of a plurality of radiating systems spaced apart at intervals along said course, each of said radiating systems including means to produce two radiations distinctive from each other, one of said radiations having maximum intensity in a plane at right angles to the course and in an elevated direction at one side of the vertical and the other radiation having maximum intensity in a plane at right angles to the course and in an elevated direction on the other side of the vertical, said systems being spaced at such distances that said radiations may be received by aircraft at all points along said course at the altitudes of usual flight and certain of said systems including means to produce a third radiation in the direction of the course.

5. The combination, in a course guiding system for aircraft, of a plurality of directive radiators located at substantially a single point, one of said radiators being oriented to produce maximum radiation in the direction of the course, and other of said radiators being oriented to produce two beams of maximum radiation simultaneously in a plane at right angles to the course, said two beams diverging in said plane relatively to each other upwardly at opposite sides of the vertical and at substantial angles to the horizontal.

6. The combination, in a system for guiding aircraft along a course, of a plurality of radiating systems along said course, each of said radiating systems producing radiations on opposite sides of the course, the radiations produced by each radiating system overlapping that produced by an adjacent radiating system, and means to modulate the radiations produced on both sides of the course by all of said radiating systems in unison, the modulation produced on one side of the course being different from that produced on the other side of the course.

7. The combination, in a system for guiding aircraft along a course, of a radiating system located at substantially a single point arranged to produce radiations in the direction of the course and directed at low elevation, and radiations on opposite sides of the course and directed at high elevation, said last named radiations being constituted each by two beams produced simultaneously in a plane at right angles to the course and diverging in said plane relatively to each other upwardly at opposite sides of the vertical, and means to alternate the production of said high and low elevation radiations.

8. The combination, in a system for guiding aircraft along a course, of a radiating system arranged to produce radiations on opposite sides of the course and directed at high elevation, and radiation in the direction of the course and directed at low elevation, means to alternate the production of said high and low elevation radiations, and means to modulate the high elevation radiation on both sides of the course, the modulation on one side of the course being different from that on the other side.

9. The combination, in a system for guiding aircraft along a course, of a radiating system located at substantially a single point arranged to produce radiation in the direction of the course and directed at low elevation, and a pair of radiations on opposite sides of the course and directed at high elevation, the two radiations constituting said pair being produced simultaneously in a plane at right angles to the course and diverging in said plane upwardly relatively to each other at opposite sides of the vertical, and means to render said different radiations distinguishable whereby the operator of an aircraft by observing said high elevation radiations is guided along the course and by observing the radiation at low elevation is informed of the low altitude of the craft.

10. The combination, in a system for guiding aircraft along a course of radiating systems spaced at intervals along said course, each of said radiating systems producing radiations on opposite sides of the course and directed at high elevation and certain of said radiating systems producing radiation in the direction of the course and directed at low elevations, means to render said radiations on opposite sides of the course distinguishable from each other and from the radiation in the direction of the course throughout the length of the course whereby an aircraft operator may be guided along the course by said high elevation radiations and may be guided with respect to altitude by said low elevation radiation.

11. The combination in a system for guiding aircraft along a course of radiating systems spaced at intervals along said course, each of said radiating systems producing radiations on opposite sides of the course and directed at high elevation, and certain of said radiating systems producing radiation in the direction of the course at low elevations, means to render said radiations on opposite sides of the course distinguishable from each other and from the radiation in the direction of the course throughout the length of the course whereby an aircraft operator may be guided along the course by said high elevation radiations, and may be guided with respect to altitude by said low elevation radiation, and means to modulate differently the low elevation radiations produced by the different radiating systems.

ERNST F. W. ALEXANDERSON.